United States Patent [19]

Nissen

[11] Patent Number: 4,764,531
[45] Date of Patent: Aug. 16, 1988

[54] METHOD OF FEEDING KETOISOCAPROATE TO LAYING CHICKENS

[75] Inventor: Steven L. Nissen, Ames, Iowa

[73] Assignee: Iowa State University Research Foundation, Inc., Ames, Iowa

[21] Appl. No.: 838,355

[22] Filed: Mar. 11, 1986

[51] Int. Cl.$^4$ ............................................. A61K 31/195
[52] U.S. Cl. ..................................... 514/557; 514/561
[58] Field of Search ................................ 514/557, 561

[56] References Cited

U.S. PATENT DOCUMENTS

| | | | |
|---|---|---|---|
| 4,100,161 | 7/1978 | Walser | 424/274 |
| 4,100,293 | 7/1978 | Walser | 424/274 |
| 4,677,121 | 6/1987 | Walser et al. | 514/561 |

OTHER PUBLICATIONS

Chow et al.–*J. Nutr.* (1974) 104:1208–1214.
Abras et al., (1982), Kidney Internation, 22:392–397.
Walser (1984), Clinical Science 66:1–15, Editorial Review, "Therapeutic Aspects of Branched-Chain Amino and Keto Acids".
Sapir et al. (1977), Metabolism, vol. 26, No. 3.
Walser (1983), New Aspects of Clinical Nutrition (pp. 319–324), "Nitrogen Sparing Effects of Branched Chain Ketoacids" (Karger, Basel).
Boebel et al. (1982), J. Nutr. 112:1929–1939.

*Primary Examiner*—Frederick E. Waddell
*Attorney, Agent, or Firm*—Tilton, Fallon, Lungmus & Chestnut

[57] ABSTRACT

A method of feeding laying chickens to increase egg production and/or reduce yolk cholesterol is provided in which alpha-ketoisocaproate (KIC) is orally administered to the laying chickens concurrently with the feeding of a protein-containing ration. The KIC is preferably fed in admixture with the ration.

5 Claims, No Drawings

METHOD OF FEEDING KETOISOCAPROATE TO LAYING CHICKENS

FIELD OF INVENTION

The field of this invention is the feeding of laying chickens to improve the quantity and quality of the eggs produced. The invention is particularly concerned with the feeding of alpha-ketoisocaproate to poultry.

BACKGROUND OF INVENTION

Keto analogs of essential amino acids have been proposed for use in human nutrition as partial or complete substitutes for the corresponding amino acids, including, for example, leucine, isoleucine, methionine, phenylalanine, and valine. Originally the use of such keto analogs was proposed by Dr. MacKenzie Walser as supplementation to proteinreduced diets in uremia. See, for example, Walser, et al. *J. Clin. Inv.* (1973) 52:678–690. Further experiments by Walser and associates demonstrated a nitrogen sparing effect from mixtures of branched-chain keto acids. Saiper and Walser, *Metabolism* (1977) 26:301–308. Patents have issued to Walser on the use of keto analogs of essential amino acids for promotion of protein synthesis and suppression of urea formation in humans. (U.S. Pat. No 4,100,161 and 4,101,293). A recent review summarized existing knowledge with respect to the administration of branched-chain keto acids to humans. "New Aspects of Clinical Nutrition," pp. 319–324 (Karger, Basel, 1983).

The keto acid analog of L-leucine is alphaketoisocaproate (KIC) which is also sometimes referred to as "ketoleucine." KIC does not have L and D forms as does leucine. It is known that there is an interconversion of circulating KIC and leucine. Published studies have demonstrated that KIC can be substituted in animal diets for leucine providing that larger molar amounts of KIC are used.

Chawla et al. reported that weight loss by rats being fed a diet deficient in leucine could be prevented by adding equimolar amounts of KIC to the diet. *J. Nutr.* (1975) 105:798–803. Other studies in rats have demonstrated that KIC is utilized less efficiently than leucine. Boebel et al. reported that the efficiency of KIC in the rat was only about 56% with reference to leucine. Boebel and Baker, *J. Nutr.* (1982) 112:1929–1939. Chow et al. obtained similar results, reporting that substitution of KIC for leucine reduced feed efficiency by approximately 33%. Chow and Walser, *J. Nutr.* (1974) 104:1208–1214

Walser and associates have published a study of the oral dosing of KIC to rats in which an increased efficiency of utilization of nitrogen was apparently observed. Abras and Walser, *Am. J. Clin. Nutr.* (1982) 36:154–161. There are no known reports describing the feeding of KIC to poultry for any purpose.

SUMMARY OF INVENTION

This invention is based on the discovery that the oral administration of alpha-ketoisocaproate (KIC) to laying chickens can have beneficial effects on both the quantity and quality of the eggs laid. The number of eggs laid can be increased. In addition it has been found that the cholesterol content of the egg yolks can be reduced. Both of these advantages can be important in connection with commercial egg production.

DETAILED DESCRIPTION

This invention is concerned with a method of producing more chicken eggs, and with producing eggs of reduced yolk cholesterol. The invention is also concerned with feed compositions for use in the method. The method utilizes a feed additive which is not present in natural feeds, the keto-analog of leucine; namely, alpha-ketoisocaproate (KIC).

For the purposes of the present invention, the KIC should be in an edible nutritionally-absorbable form. For example, it may be used as its sodium, potassium, ammonium or calcium salt. Ammonium and alkali m tal salts are more water-soluble, while alkaline earth metal salts such as calcium salt are less water-insoluble. For the purposes of this invention the more water-soluble KIC salts are preferred, such as sodium KIC.

Alpha-ketoisocaproate (KIC) is available commercially or can be synthesized by known procedures. KIC in the form of its sodium or calcium salts can be purchased from SOBAC, 336 Rue Saint-Honore, Paris, France, and/or through Sigma Chemical Company, St. Louis, Mo. Sodium and calcium salts of KIC as supplied commercially are substantially pure compounds and are in the form of dry powders. However, high purity is not necessarily required for the purposes of the present invention.

KIC powders can be mixed with dry feeds for dry feed compositions or the water-soluble KIC sales can be administered by dissolving in drinking water. It is preferred to mix a dry KIC salt with the dry chicken feed ingredients at predetermined concentrations. The KIC salt can be incorporated by using standard mixing and blending equipment. KIC is probably substantially uniformly distributed throughout the feed. After mixing, if desired, the feed material may be further processed, such as by conversion to pellets The chicken feed compositions will usually be composed of mixtures of feed ingredients, including protein-providing ingredients. The feed compositions may comprise complete feeds or feed concentrates. For optimized results, it is believed desirable to include only limited quantities of proteinaceous feed ingredients which are high in leucine content. Such feed ingredients include blood meals, which may contain 16 to 20% leucine, and corn gluten meal containing 18 to 20% leucine (based on the protein dry weight). In contrast, soybean meal contains only bout 8 to 9% leucine.

For the purpose of the present invention, it is preferred to limit the amount of leucine in the diet of the chickens to not over 12% by weight based on the dry weight of the total protein being consumed. The amount of protein can be calculated by determining nitrogen and multiplying by a standard conversion factor of 6.25 ($N \times 6.25$). In preferred embodiments, the amount of leucine is limited to less than 10% by weight of total protein. Consequently, in the formulation of complete feeds or feed concentrates which are to provide a major portion of the diet of the chickens, it is desirable to maintain the leucine content of the feed composition at not over 12%. The preferred amount of leucine in the mixed feed is below 10% based on protein dry weight.

Broadly stated, the method of this invention comprises orally administering to laying chickens from 0.01 to 1.0 weight percent (wt %) of alpha-ketoisbcaproate (KIC) based on the dry weight of the total feed diet. The amount of KIC can be referenced to sodium KIC and its molar equivalents. In preferred embodiments, the amount of KIC administered to the laying chickens is from 0.05 to 0.5 wt % KIC (sodium KIC basis) based on the dry weight of the feed consumed by the chickens.

For purposes of the present application, the specified weight amounts of KIC should be understood to be related to the sodium salt of KIC or a molar equivalent amount of the calcium salt or other salts or derivatives providing nutritionably absorbable and utilizable KIC.

When KIC is combined with the feed material as a uniform admixture, and the feed composition is intended to provide substantially the complete diet of the chickens, the amount of KIC may be specified in relation to the feed composition. For example, admixed feed compositions may contain from 0.01 to 1.0 wt % KIC (sodium KIC basis) in relation to the dry weight of the feed composition. In preferred embodiments for the formulation of complete feeds, the feed compositions preferably contain from 0.05 to 0.5 wt % KIC (sodium KIC) based on feed dry weight. Such feed compositions will usually contain at least 10% protein and may contain up to 18% protein (N×6.25).

The method and feed composition of this invention are further illustrated by the following example.

EXAMPLE

Hens (69 weeks of age) were randomly assigned to either a control diet or a diet containing 0.2 wt. % KIC (Na). For the next 28 days feed consumption was recorded and eggs collected. Eggs were weighed and analyzed for egg yolk cholesterol. The feed composition is shown in Table A and the results in Table B. The total protein was about 18% on a dry matter basis, and the amount of leucine was about 9% of the protein. The control diet was the same except for the omission of the KIC.

TABLE A

| Ingredients | lbs/1000 lbs |
| --- | --- |
| KIC (Na salt) | 2.0 |
| Corn (fine ground) | 672.5 |
| Soyabean meal (48% protein) | 214.0 |
| Meat & bone meal (50% protein) | 20.0 |
| Animal fat | 15.0 |
| Limestone (powder) | 60.0 |
| Dicalcium phosphate | 10.0 |
| D,L methionine | 0.5 |
| Vitamin premix | 5.0 |

TABLE A-continued

| Ingredients | lbs/1000 lbs |
| --- | --- |
| Salt & trace minerals | 3.0 |

TABLE B

| No. Birds | Average No. Eggs/Hen | Feed Average (gms/hen/day) | Av. Eggs (kg./hen) | Avg. Yolk Cholesterol (mg/100 gms) |
| --- | --- | --- | --- | --- |
| 16 Control | 17.7 | 109 | 1.105 | 1068 |
| 16 Fed KIC | 19.5 | 109 | 1.233 | 996 |
| % Change | +10.2 | 0 | +11.1 | −7 |

The foregoing diet with KIC is indicated as a desirable ration for commercial use to increase egg production with the same amount of feed, and/or to reduce egg yolk cholesterol.

I claim:

1. The method of feeding laying chickens to increase egg production and/or reduce yolk cholesterol, comprising admixing alpha-ketoisocaproate (KIC) with the protein-containing feed ration for the laying chickens, said admixed ration containing 0.05 to 0.5 weight percent of KIC based on sodium KIC and the dry weight of the feed, said feed containing not over 12% leucine based on the dry weight of the total protein and feeding said admixed ration to said laying hens as substantially their entire diet.

2. The method of claim 1 in which said admixed ration contains not over 10 % leucine based on the dry weight of the total protein therein.

3. The method of feeding laying chickens to increase egg production and/or reduce yolk cholesterol, comprising orally administering to said laying chickens ketoisocaproate (KIC) while said chickens are being fed a protein-containing feed ration, the amount of KIC administered being within the range from 0.01 to 1.0 weight percent (wt %) of said ration based on sodium KIC and the dry weight of the ration, and being an amoount effective to increase egg production and/or reduce yolk cholesterol.

4. The method of claim 3 in which said KIC is sodium KIC.

5. The method of claim 3 in which the amount of KIC administered is within the range from 0.05to 0.5wt % of said ration based on sodium KIC and the dry weight of the ration.

* * * * *